(12) United States Patent
Major et al.

(10) Patent No.: US 7,861,547 B2
(45) Date of Patent: Jan. 4, 2011

(54) HVAC SYSTEM CONTROL FOR IMPROVED VEHICLE FUEL ECONOMY

(75) Inventors: Gregory A. Major, Farmington Hills, MI (US); Harry E. Eustice, Troy, MI (US); Kenneth L. Porrett, Grand Blanc, MI (US); Edwin J. Stanke, Pontiac, MI (US); Todd J. Gordon, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 412 days.

(21) Appl. No.: 12/128,104

(22) Filed: May 28, 2008

(65) Prior Publication Data

US 2009/0293521 A1 Dec. 3, 2009

(51) Int. Cl.
*F25B 49/00* (2006.01)
*B60H 1/32* (2006.01)
(52) U.S. Cl. ............................ 62/228.1; 62/201; 62/243
(58) Field of Classification Search .................... 62/157, 62/201, 228.1, 228.5, 231, 243
See application file for complete search history.

(56) References Cited

U.S. PATENT DOCUMENTS 6,755,032 B1 * 6/2004 Kotwicki et al. .............. 62/133

* cited by examiner

*Primary Examiner*—Marc E Norman

(57) ABSTRACT

A method of operating a HVAC system in a vehicle having an engine that operates in a high efficiency mode and a less efficient mode is disclosed. The method may comprise the steps of: operating a refrigerant compressor to cool a passenger compartment and charge a cold thermal storage apparatus; determining if a cold charge in the storage apparatus has exceeded a threshold; enabling compressor cycling if the cold charge in the storage apparatus has exceeded the threshold; detecting if the engine is operating in the high efficiency mode; determining an amount of HVAC loads on the engine; determining a proximity of the engine operation to a switching point from the high efficiency mode to the less efficient mode; and conducting a HVAC load shed if the HVAC load reduction allows the engine to stay below the switching point and the compressor cycling is enabled.

20 Claims, 5 Drawing Sheets

HVAC SYSTEM CONTROL FOR IMPROVED VEHICLE FUEL ECONOMY

BACKGROUND OF INVENTION

The present invention relates generally to heating, ventilation and air conditioning (HVAC) systems for automotive vehicles, and more particularly to controlling HVAC systems having thermal storage to improve vehicle fuel economy.

In order to improve the fuel economy of automotive vehicles, some are creating engine/powertrain systems to operate in high efficiency modes under certain light load operating conditions. Such high efficiency modes may include, for example, cylinder deactivation or homogeneous charge, compression ignition (HCCI) engine operating modes. Thus, it is desirable to be able to operate the vehicles for a high percentage of the time in the high efficiency modes (as opposed to less efficient normal engine operating modes). But these high efficiency modes can generally only operate when the load from the vehicle is below a certain level.

SUMMARY OF INVENTION

An embodiment contemplates a method of operating a HVAC system in a vehicle having an engine that operates in a high efficiency mode and a less efficient mode, the method comprising the steps of: operating a refrigerant compressor to cool a passenger compartment and charge a cold thermal storage apparatus; determining if a cold charge in the cold thermal storage apparatus has exceeded a predetermined threshold; enabling compressor cycling if the cold charge in the cold thermal storage apparatus has exceeded the predetermined threshold; detecting if the engine is operating in the high efficiency mode; determining an amount of HVAC loads on the engine; determining a proximity of the engine operation to a switching point from the high efficiency mode to the less efficient mode; and conducting a HVAC load shed to reduce the HVAC loads on the engine if the HVAC load reduction allows the engine operation to stay below the switching point for the high efficiency mode and the compressor cycling is enabled.

An embodiment contemplates a method of operating a HVAC system in a vehicle having an engine that operates in a high efficiency mode and a less efficient mode, the method comprising the steps of: operating a refrigerant compressor to cool a passenger compartment and charge a cold thermal storage apparatus; determining if the refrigerant compressor has been continuously operating longer than a predetermined compressor run time period; detecting if the engine is operating in the high efficiency mode; determining an amount of HVAC loads on the engine; determining a proximity of the engine operation to a switching point from the high efficiency mode to the less efficient mode; conducting a HVAC load shed to reduce the HVAC loads on the engine if the HVAC load reduction allows the engine operation to stay below the switching point for the high efficiency mode and the refrigerant compressor has been continuously operating longer than the predetermined compressor run time period; monitoring a HVAC comfort level after the HVAC load shed occurs; comparing the HVAC comfort level to a predetermined set point; and activating the refrigerant compressor when the HVAC comfort level drops below the predetermined set point.

An advantage of an embodiment is that the vehicle engine/powertrain may remain in the high efficiency mode longer by using the stored thermal energy to cool a passenger cabin, thus improving the vehicle fuel economy.

DETAILED DESCRIPTION

Figure 1:
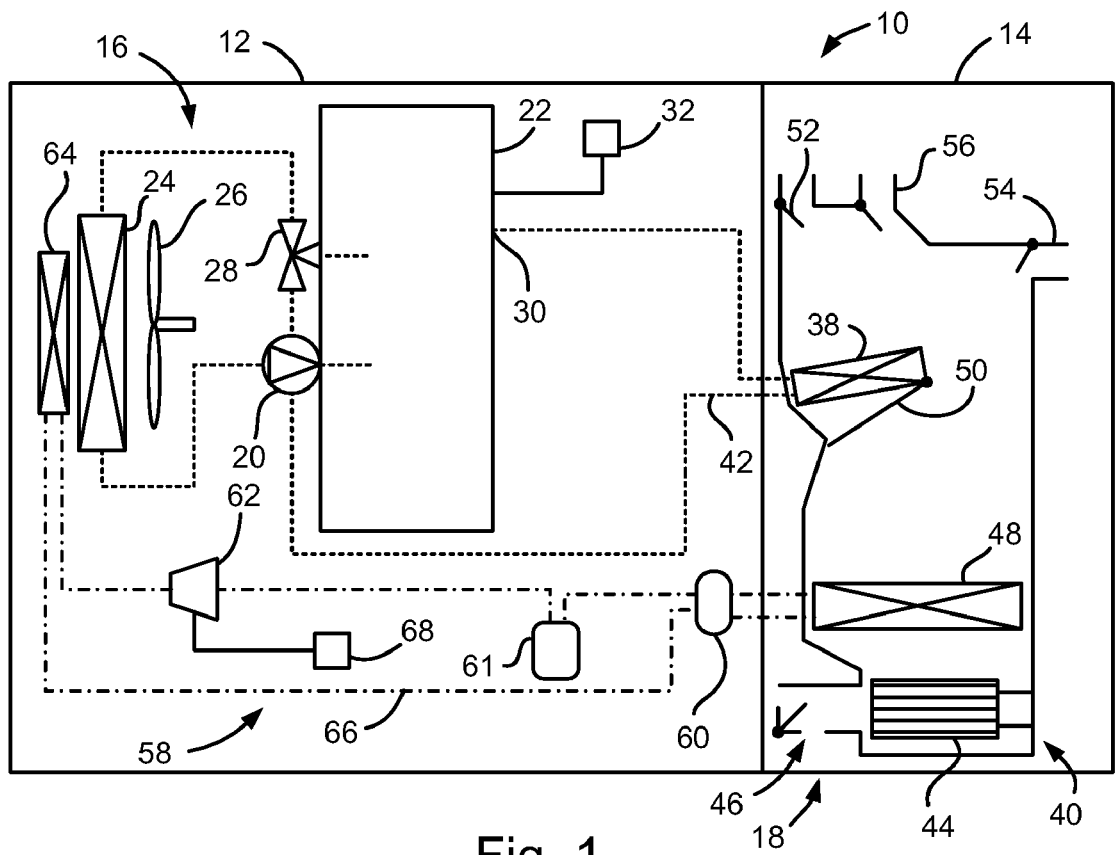
FIG. 1 is a schematic view of an automotive vehicle, illustrating a first embodiment of a HVAC system.

Referring to FIG. 1, a portion of an automotive vehicle, indicated generally at 10, is shown. The vehicle 10 may have a hybrid powertrain or may be powered solely by an internal combustion engine 22. The vehicle 10 includes an engine compartment 12 and a passenger compartment 14. Within the compartments 12, 14 are an engine cooling system 16 and a heating, ventilation and air conditioning (HVAC) system 18.

The engine cooling system 16 includes a water pump 20 that pushes water through the engine 22 and other portions of the engine cooling system 16. This water pump 20 may be driven by the engine 22. A radiator 24 and fan 26 are employed for removing heat from the engine coolant. A thermostat 28 may be employed in a conventional fashion for selectively blocking the flow of coolant through the radiator 24 when the coolant is below a desired operating temperature.

A powertrain controller 32 controls the engine operation, including switching the engine operation between a normal operating mode and a high efficiency operating mode, such as, for example, a cylinder deactivation mode where a portion of the cylinders in the engine 22 are deactivated and/or a homogeneous charge, compression ignition (HCCI) mode where a homogeneous fuel/air charge is ignited by compression.

A heater core outlet 30 from the engine 22 directs coolant to a heater core 38, located in a HVAC module 40. A coolant line 42 directs coolant from the heater core 38 to an inlet to the water pump 20. The dashed lines shown in FIGS. 1-4 represent coolant lines through which engine coolant flows.

The HVAC system 18 includes the HVAC module 40, within which is located a blower 44 for drawing air in through an air inlet 46 and directing it through an evaporator 48. Downstream of the evaporator 48 is the heater core 38, which has a blend door 50 located on its upstream side that selectively directs air around or through the heater core 38. The HVAC module 40 may also include a defrost outlet and door 52, a floor outlet and door 54, and a chest height outlet and door 56, which direct air into different portions of the passenger compartment 14.

A cooling portion 58 of the HVAC system 18 may include the evaporator 48, a thermal expansion valve 60, a refrigerant thermal storage bottle 61, a refrigerant compressor 62, and a condenser 64 connected together via refrigerant lines 66. The dash-dot lines shown in FIGS. 1-4 represent refrigerant lines through which refrigerant flows. The compressor 62 may be driven by the engine 22 in a conventional fashion, thus saving the cost of a separate electric motor to drive the compressor 62, if so desired. The refrigerant thermal storage bottle 61 stores chilled refrigerant as a form of cold thermal storage.

The HVAC system 18 also includes a HVAC controller 68 that communicates with the powertrain controller 32 and controls the compressor 62, as well as the blower 44, blend door 50 and the outlet doors 52, 54, 56. The powertrain controller 32 may also control the fan speed 26. Accordingly, various portions of the HVAC system 18 and engine 22 can be automatically controlled to optimize vehicle fuel economy while providing for adequate air conditioning to the passenger compartment 14.

Figure 2:
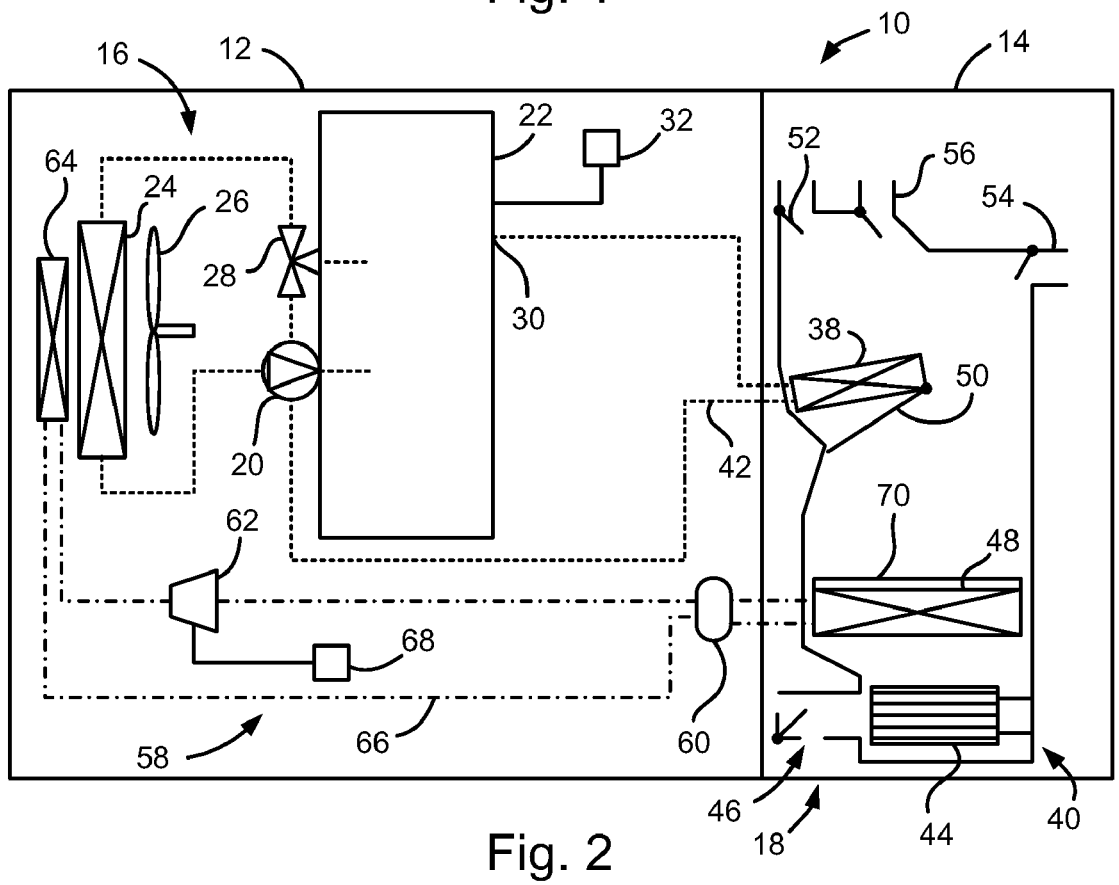
FIG. 2 is schematic view similar to FIG. 1, but illustrating a second embodiment.

FIG. 2 illustrates a second embodiment. Since this embodiment is similar to the first, and to avoid unnecessary repetition of the description, the same element numbers will be used for elements that are essentially the same as in the first embodiment. In this embodiment, the engine cooling system 16 and the HVAC module 40 are the same as in the first embodiment. However, the cooling portion 58 of the HVAC system 18 and thermal storage have changed. A cold thermal storage area 70 is now incorporated into the evaporator 48 rather than employing a separate thermal storage bottle in the refrigerant line between the evaporator 48 and the compressor 62. The rest of the HVAC system 18 may be essentially unchanged.

Figure 3:
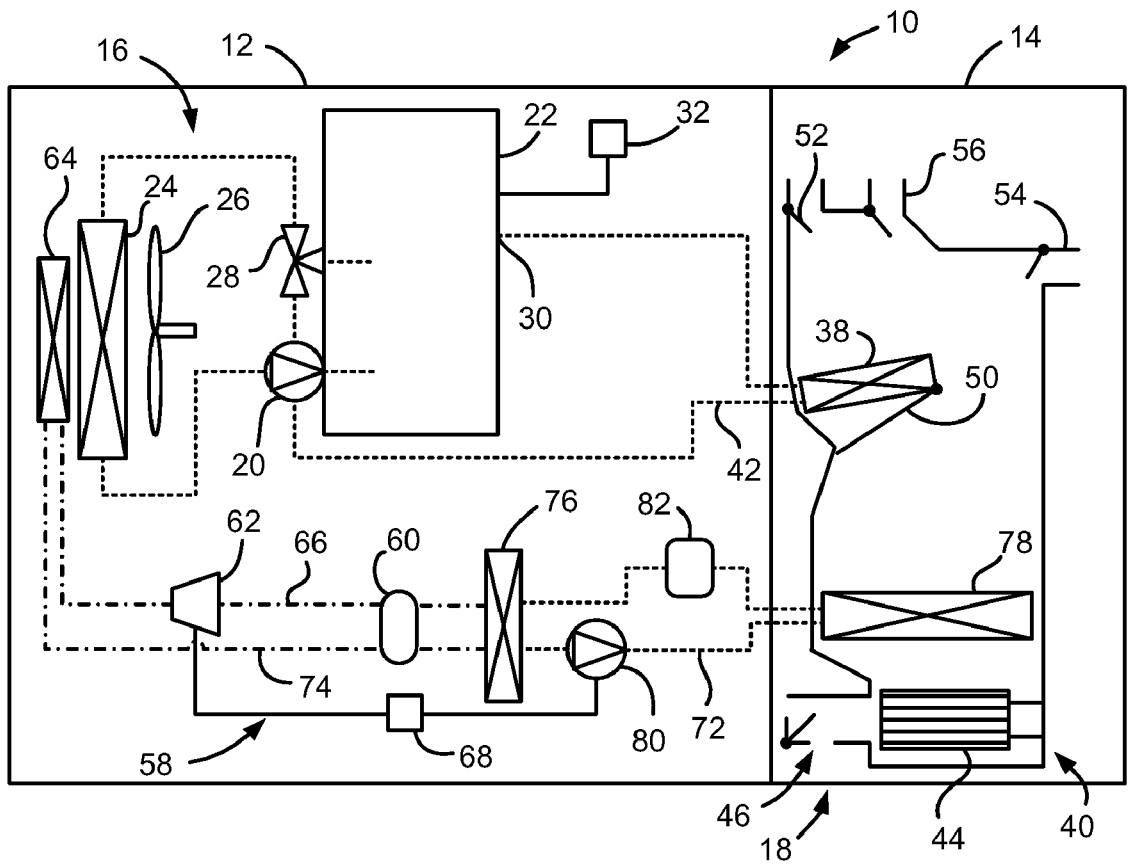
FIG. 3 is a schematic view similar to FIG. 1, but illustrating a third embodiment.

FIG. 3 illustrates a third embodiment. Since this embodiment is similar to the first, and to avoid unnecessary repetition of the description, the same element numbers will be used for elements that are essentially the same as in the first embodiment. A secondary loop 72 is now employed in the cooling portion 58 in addition to the primary refrigerant loop 74. A refrigerant-to-liquid heat exchanger 76 is part of both loops 72, 74, transferring heat from the liquid in the secondary loop 72 to the refrigerant in the primary loop 74. The liquid may be, for example, a common engine coolant mixture of water and ethylene glycol, or it may be some other liquid with suitable heat transfer properties. A chiller 78 is now located in the HVAC module 40 instead of a refrigerant evaporator, and a pump 80 is controlled by the HVAC controller 68 to selectively pump the liquid through the secondary loop 72. A cold thermal storage bottle 82 for storing cooled liquid is also located in the secondary loop 72.

Figure 4:
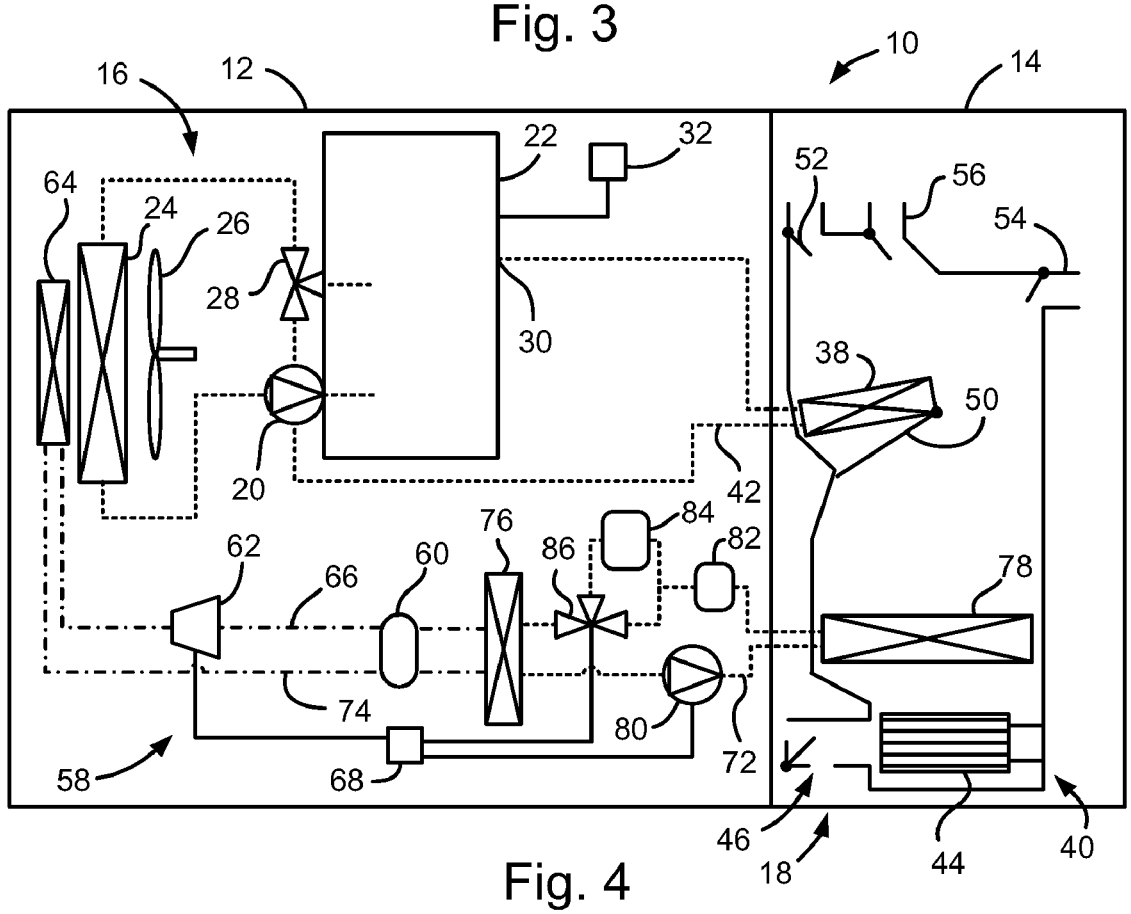
FIG. 4 is a schematic view similar to FIG. 1, but illustrating a fourth embodiment.

FIG. 4 illustrates a fourth embodiment. Since this embodiment is similar to the third, and to avoid unnecessary repetition of the description, the same element numbers will be used for elements that are essentially the same as in the third embodiment. In this embodiment, the secondary loop 72 also includes a second, larger thermal storage bottle 84 and a valve 86, controlled by the HVAC controller 68, that can selectively direct the liquid through or around the larger thermal storage bottle 84. This allows for increased thermal storage capacity versus the third embodiment, without increasing the cool down time of the passenger compartment 14, but with higher costs for the additional bottle 84 and valve 86.

Figure 5A:
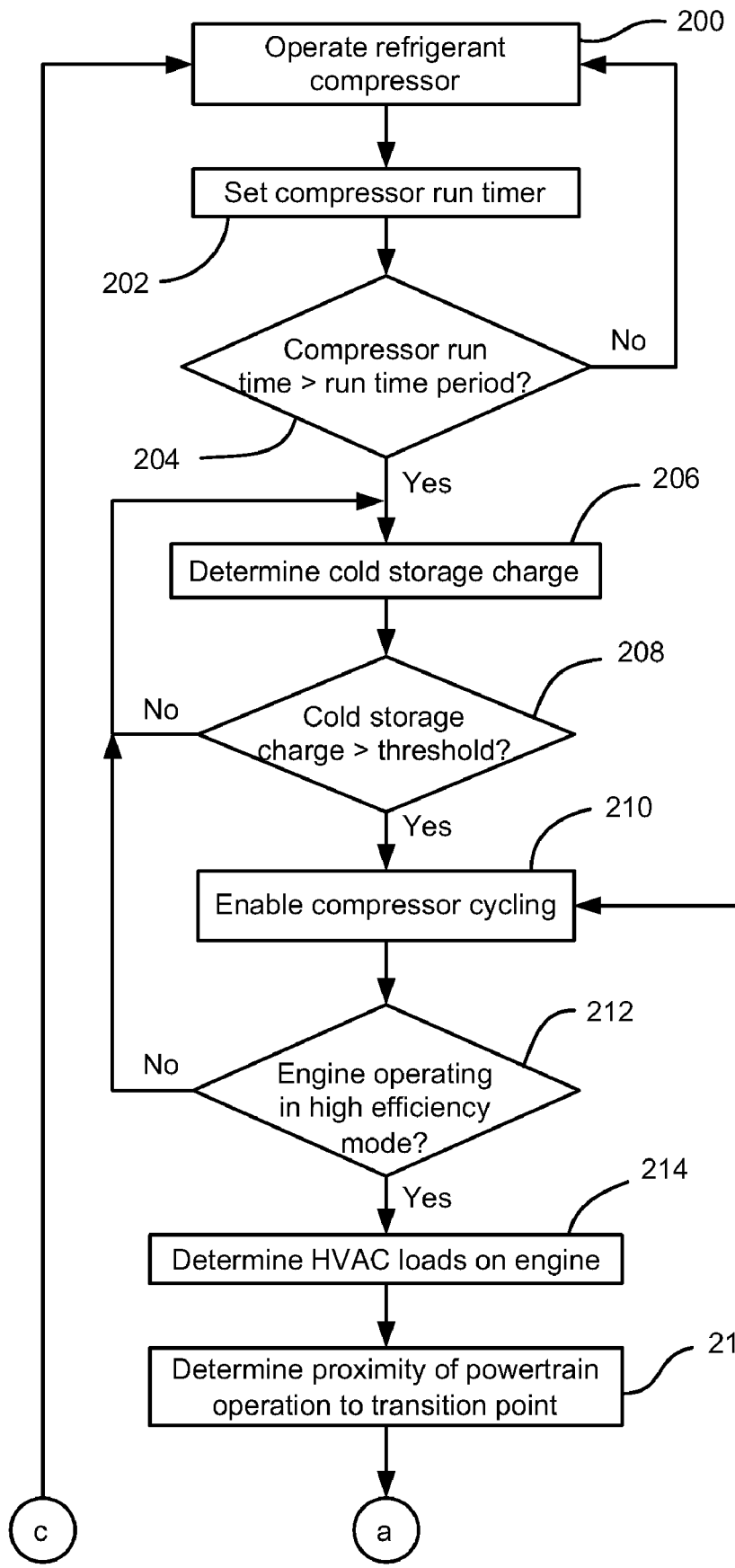
FIGS. 5A and 5B are a flow chart illustrating a method for operating the HVAC systems of FIGS. 1-4.
Figure 5B:
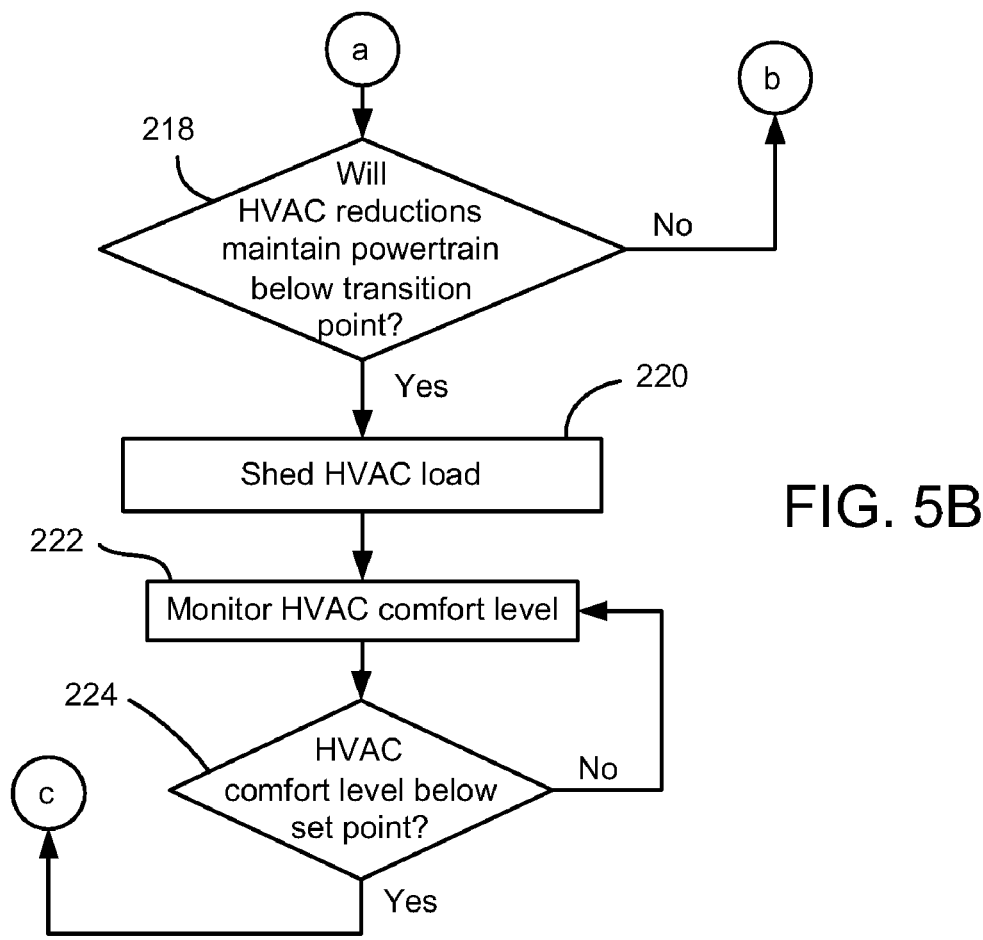

FIGS. 5A and 5B are a flow chart illustrating a method for operating the HVAC systems of FIGS. 1-4. When operating an automotive vehicle in a high efficiency mode, the HVAC system 18 can be a significant portion of the load on the engine 22 under certain operating conditions. The following method detects if the engine 22 is near the threshold for switching to a lower efficiency mode and if there is cold thermal energy stored that can be tapped for use to continue cooling the passenger compartment 14. If so, then the HVAC system 18 can be adjusted to reduce the load (load shed) on the engine 22, thus allowing the engine to remain in the high efficiency mode for a longer period of time while still providing cooling to the passenger compartment 14.

When air conditioning is initially requested, the refrigerant compressor 62, which is controlled by the HVAC controller 68, is operated, block 200. Also, a compressor run timer is set in the HVAC controller 68, block 202. The compressor 62 continues to operate until the compressor run time is greater than a predetermined run time period, block 204.

Once the compressor run time has exceeded the predetermined run time period, a cold storage charge is determined, block 206. The cold storage may comprise, for example, any of the cold storage systems shown in FIGS. 1-4—that is, a refrigerant thermal storage bottle 61 (FIG. 1), a cold thermal storage area 70 in the evaporator 48 (FIG. 2), a coolant thermal storage bottle 82 (FIG. 3), or a larger coolant thermal storage bottle 84 and valve 86 (FIG. 4).

Figure 6:
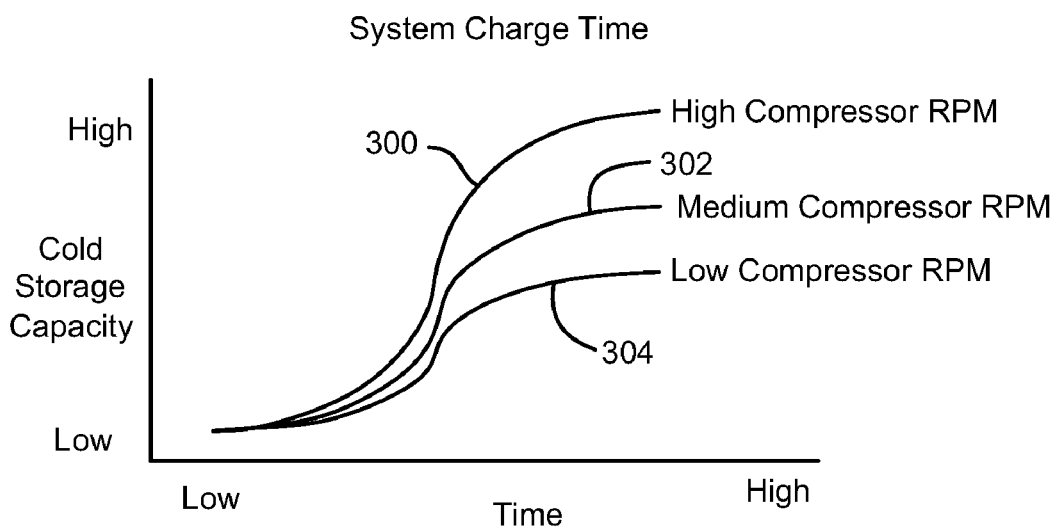
FIG. 6 is a graph illustrating charging time for a cold thermal storage portion of the HVAC system.

FIG. 6 illustrates an example of one way that a cold thermal storage charge is determined in block 206, by a look-up table. For a low compressor speed (RPM) the charge capacity over a given time 304 is less than the charge capacity over that time for a medium compressor speed 304 or a high compressor speed 300. Other empirical or mathematical methods may be used instead to determine the cold storage capacity, if so desired.

Returning to FIGS. 5A and 5B (in view of FIGS. 1-4), the refrigerant compressor 62 continues to operate, and the cold storage charge is compared to a cold storage threshold, block 208. If the cold storage charge is not above the threshold, then the compressor 62 continues to operate and an updated cold storage charge is determined. When the cold storage charge exceeds the threshold, then compressor cycling is enabled, block 210. That is, the compressor 62 can be turned off, when desired, and the cold thermal storage can be employed to provide the cooling to the passenger compartment 14.

If compressor cycling is enabled, it is then determined if the engine 22 is operating in high efficiency mode, block 212. If not, then compressor operation and cold storage checks can continue. If it is operating in high efficiency mode, block 212, then HVAC loads on the engine are determined, block 214.

Figure 7:
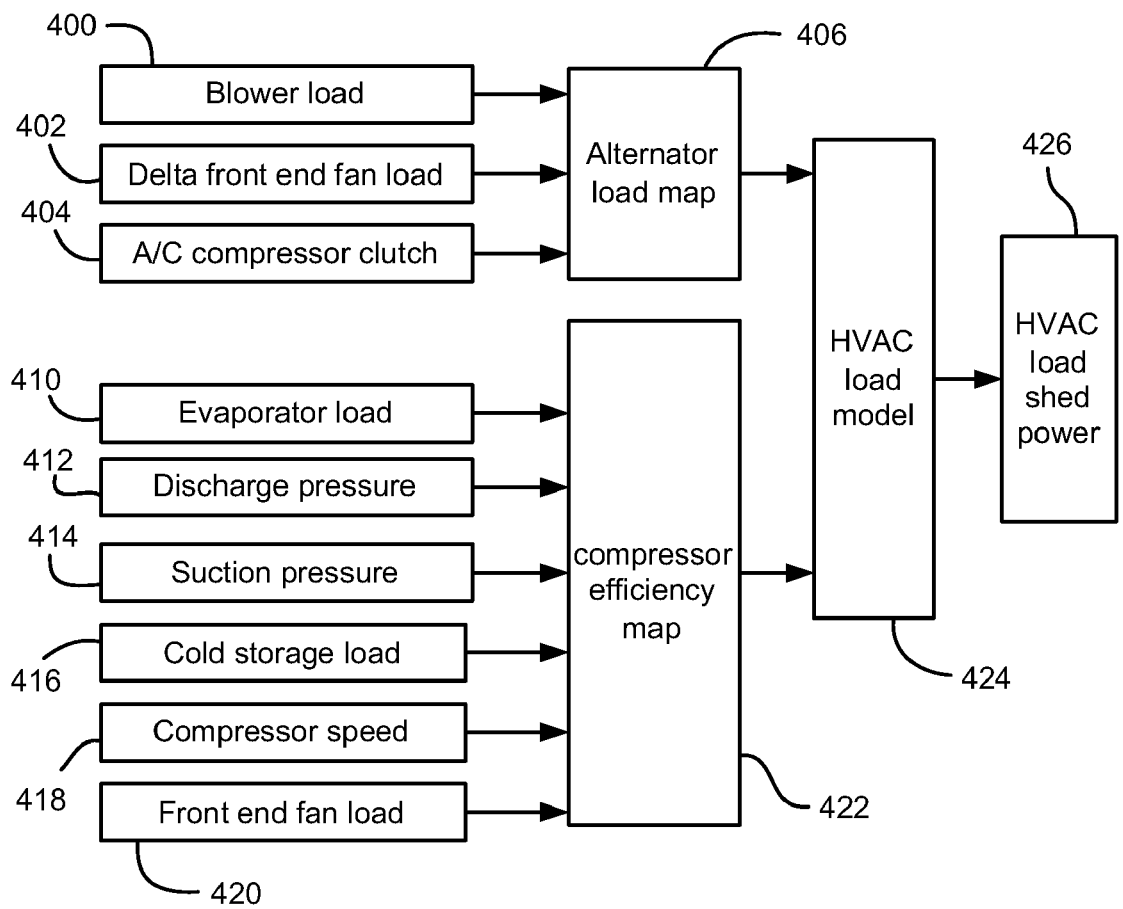
FIG. 7 is a block diagram of HVAC load shed inputs and controls.

FIG. 7 illustrates potential HVAC load inputs that result in additional load on the engine 22. The electrical load from operating the blower 44, block 400, the increase in electrical load on the front end fan 26 due to the air conditioner operation (over and above powertrain cooling fan load), block 402, and the electrical load needed to engage the refrigerant compressor clutch, block 404, all contribute to the alternator load map, block 406. The operation of the alternator (not shown) puts a load on the engine 22, with the operation of the HVAC system 18 increasing that load.

In addition, the refrigerant compressor 62 puts a load on the engine 22. The evaporator load, block 410, refrigerant discharge pressure, block 412, refrigerant suction pressure, block 414, cold storage load, block 416, compressor speed, block 418, and the front end fan load, block 420, all contribute to the compressor efficiency map, block 422, for the refrigerant compressor 62. The alternator load map, block 406, and the compressor efficiency map, block 422, are combined to produce the HVAC load model, block 424. The HVAC load model, block 424, indicates how much load the HVAC system 18 is putting on the engine 22. Thus, the possible power that the HVAC system 18 can shed, block 426, is known.

Returning to FIGS. 5A and 5B (in view of FIGS. 1-4), the proximity of the engine (powertrain) operation to a transition point between high efficiency mode and a lower efficiency operating mode is determined, block 216. Knowing the potential power that can be shed from the HVAC system 18 and the proximity of the engine operation to the transition point, a determination is made as to whether HVAC load shed reductions will allow the engine (powertrain) to remain operating below this transition point, block 218. If not the compressor 62 continues operation, with the engine 22 switched to the less efficient operating mode, with checks at later times to determine fit he engine is again operating in the high efficiency mode.

If HVAC load shed will allow the engine 22 to continue operating in the high efficiency mode, then HVAC load is shed, block 220. The amount of power shed can be up to the amount indicated by block 426 (FIG. 7). This load shed, then, may include disengaging the clutch of the compressor 62 (or reducing the compressor capacity if it is a variable compressor), reducing the speed of the blower 44, and/or reducing the speed of the front end fan 26—all of which will reduce the load on the engine 22, allowing the engine 22 to remain operating in the high efficiency mode. During the HVAC load shed event, the air inlet 46 into the HVAC module 40 may be switched to increase the recirculation of air, thus reducing the cooling load on the passenger compartment 14. The cooling of the passenger compartment 14 is achieved by using the cold thermal storage in the HVAC system 18. Thus, a combination of HVAC controls (provided by the HVAC controller 68) with engine controls (provided by the powertrain controller 32) and cold thermal storage (provided by the thermal storage bottle 61, cold storage area 70, thermal storage bottle 82, or larger thermal storage bottle 84) allows for improved vehicle fuel economy.

Since the cooling is now being provided by the stored cold thermal energy, which is dissipated as the HVAC system 18 operates in this mode, the HVAC comfort level is monitored, block 222. If the HVAC comfort level remains above a set point, block 224, then the HVAC system 18 continues to use the stored cold thermal energy. If the HVAC comfort set level drops below the set point, block 224, then the refrigerant compressor 62 is again operated. This may necessitate changing the operating mode of the engine 22 to a lower efficiency mode to account for the increased engine loads. The value of the set point may be based on maximum evaporator air discharge temperature, a breath temperature in the passenger compartment 14, a change in breath temperature, solar load in the passenger compartment 14, a blower speed, or a combination of some or all of these factors.

Figure 8:
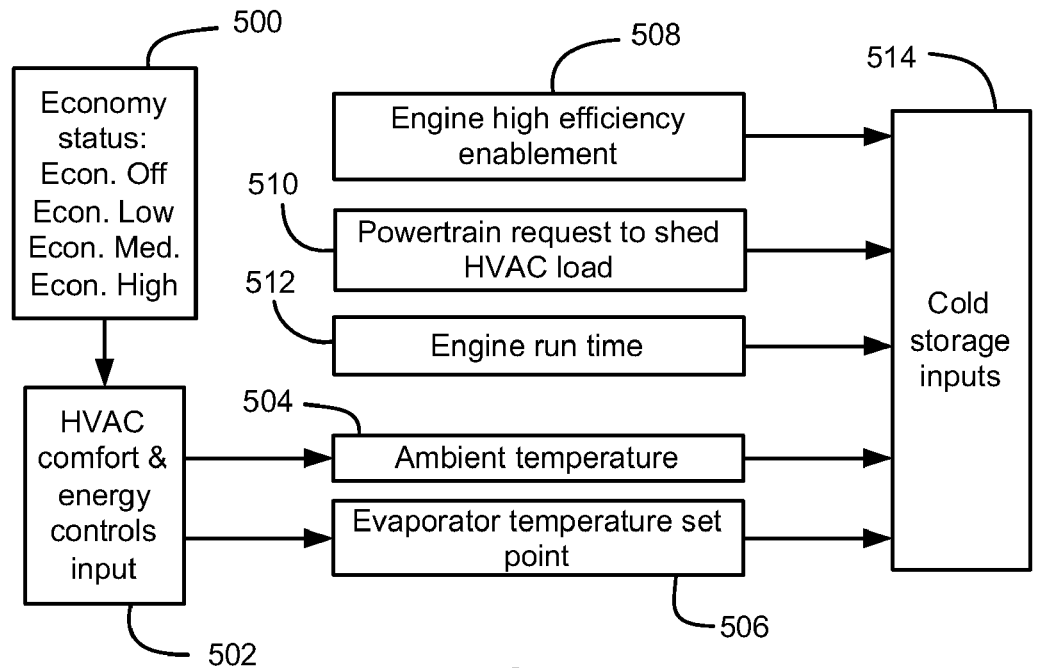
FIG. 8 is a block diagram of cold thermal storage inputs for the HVAC system.

FIG. 8 illustrates how the cold thermal storage inputs for the HVAC system 18 may be employed to vary the set point used in block 224, allowing a vehicle operator to have some input into the efficiency decision relating to engine operation. That is, one may set a switch (not shown) in the passenger compartment 14 to different economy statuses, such as, for example, economy off, economy low, economy medium and economy high, block 500. This setting determines how far the HVAC system 18 is allowed to drift from the most desired set point before activating the compressor 62 and changing the engine operating mode to a less efficient one. Certain vehicle occupants may be willing to accept greater degrees of discomfort to extend the engine efficient mode operation. Based on the switch setting, an HVAC comfort and energy controls input is set, block 502. This may be affected by an evaporator air temperature set point, block 506 and an ambient air temperature measurement, block 504. These values, along with a determination of engine high efficiency enablement, block 508, a powertrain request to shed HVAC load, block 510, and an engine run time measurement, block 512, define cold storage inputs, block 514, that determine how long the cold thermal storage may be employed before compressor activation is requested.

Additional efficiency strategies may be employed with the method of FIGS. 5A and 5B to further improve the vehicle fuel economy. For example, the compressor 62 may be shut off during vehicle accelerations to improve fuel economy. The strategy may also include compressor off at engine idle and during vehicle deceleration (when sufficient cold thermal storage is available). Moreover, the compressor 62 (if variable capacity) may be operated with deeper cycling of the compressor (100% on and off) to increase efficiency, rather than modes with the compressor 62 running at a reduced capacity.

While certain embodiments of the present invention have been described in detail, those familiar with the art to which this invention relates will recognize various alternative designs and embodiments for practicing the invention as defined by the following claims.

What is claimed is:

1. A method of operating a HVAC system in a vehicle having an engine that operates in a high efficiency mode and a less efficient mode, the method comprising the steps of:
   (a) operating a refrigerant compressor to cool a passenger compartment and charge a cold thermal storage apparatus;
   (b) determining if a cold charge in the cold thermal storage apparatus has exceeded a predetermined threshold;
   (c) enabling compressor cycling if the cold charge in the cold thermal storage apparatus has exceeded the predetermined threshold;
   (d) detecting if the engine is operating in the high efficiency mode;
   (e) determining an amount of HVAC loads on the engine;
   (f) determining a proximity of the engine operation to a switching point from the high efficiency mode to the less efficient mode; and
   (g) conducting a HVAC load shed to reduce the HVAC loads on the engine if the HVAC load reduction allows the engine operation to stay below the switching point for the high efficiency mode and the compressor cycling is enabled.

2. The method of claim 1 wherein the high efficiency mode includes operating the engine in a homogeneous charge, combustion ignition operating mode.

3. The method of claim 1 wherein the high efficiency mode includes operating the engine in a cylinder deactivation operating mode.

4. The method of claim 1 wherein step (a) is further defined by the cold thermal storage apparatus being a refrigerant thermal storage bottle located in a refrigerant loop between an evaporator and the refrigerant compressor, and charging the cold thermal storage apparatus includes flowing a cooled refrigerant through the refrigerant thermal storage bottle.

5. The method of claim 1 wherein step (a) is further defined by the cold thermal storage apparatus being a cold thermal storage area in an evaporator located in an HVAC module, and charging the cold thermal storage apparatus includes flowing a cooled refrigerant through the cold thermal storage area.

6. The method of claim 1 wherein step (a) is further defined by the HVAC system including a secondary coolant loop and the cold thermal storage apparatus being a coolant thermal storage bottle located in the secondary coolant loop between a chiller and a refrigerant-to-liquid heat exchanger, and charging the cold thermal storage apparatus includes flowing a cooled coolant through the coolant thermal storage bottle.

7. The method of claim 1 wherein step (a) is further defined by the HVAC system including a secondary coolant loop and the cold thermal storage apparatus being a coolant thermal storage bottle located in the secondary coolant loop between a chiller and a refrigerant-to-liquid heat exchanger, with a valve located in the secondary coolant loop that is switchable to selectively direct the coolant flow through the coolant thermal storage bottle and to bypass the coolant thermal storage bottle; and charging the cold thermal storage apparatus includes switching the valve to direct the coolant flow through the coolant thermal storage bottle and flowing a cooled coolant through the coolant thermal storage bottle.

8. The method of claim 1 wherein the HVAC load shed includes deactivating the refrigerant compressor.

9. The method of claim 8 wherein the HVAC load shed includes slowing a blower speed for a blower in a HVAC module.

10. The method of claim 8 wherein the HVAC load shed includes slowing a speed of a front end fan.

11. The method of claim 1 comprising the steps of:
(h) monitoring a HVAC comfort level;
(i) comparing the HVAC comfort level to a predetermined set point; and
(j) activating the refrigerant compressor when the HVAC comfort level drops below the predetermined set point.

12. The method of claim 11 including the step of: setting the predetermined set point at a different predetermined level based on a user settable fuel economy status.

13. The method of claim 12 wherein the set point is based on an evaporator air temperature measurement.

14. The method of claim 11 including the step of: setting the predetermined set point at a different predetermined level based on a user settable fuel economy status.

15. The method of claim 1 wherein the refrigerant compressor is a variable capacity refrigerant compressor and the load shed includes reducing an operating capacity of the variable capacity refrigerant compressor sufficient to allow the engine to continue operating in the high efficiency mode.

16. The method of claim 1 wherein step (c) is further defined by: enabling the compressor cycling if the cold charge in the cold thermal storage apparatus has exceeded the predetermined threshold and the refrigerant compressor has been continuously operating longer than a predetermined compressor run time period.

17. A method of operating a HVAC system in a vehicle having an engine that operates in a high efficiency mode and a less efficient mode, the method comprising the steps of:
(a) operating a refrigerant compressor to cool a passenger compartment and charge a cold thermal storage apparatus;
(b) determining if the refrigerant compressor has been continuously operating longer than a predetermined compressor run time period;
(c) detecting if the engine is operating in the high efficiency mode;
(d) determining an amount of HVAC loads on the engine;
(e) determining a proximity of the engine operation to a switching point from the high efficiency mode to the less efficient mode;
(f) conducting a HVAC load shed to reduce the HVAC loads on the engine if the HVAC load reduction allows the engine operation to stay below the switching point for the high efficiency mode and the refrigerant compressor has been continuously operating longer than the predetermined compressor run time period;
(g) monitoring a HVAC comfort level after the HVAC load shed occurs;
(h) comparing the HVAC comfort level to a predetermined set point; and
(i) activating the refrigerant compressor when the HVAC comfort level drops below the predetermined set point.

18. The method of claim 17 wherein the HVAC load shed includes deactivating the refrigerant compressor.

19. The method of claim 17 wherein the refrigerant compressor is a variable capacity refrigerant compressor and the load shed includes reducing an operating capacity of the variable capacity refrigerant compressor sufficient to allow the engine to continue operating in the high efficiency mode.

20. The method of claim 17 including the step of (j) continuing the refrigerant compressor operation and switching the engine to the less efficient mode if the HVAC load reduction would not allow the engine to stay below the switching point for the high efficiency mode.

* * * * *